Oct. 28, 1969  R. C. JOHNSON ET AL  3,474,774
METHOD AND APPARATUS FOR PRESENTATION OF
AURAL EFFECTS AND VISUAL DISPLAYS
Filed Nov. 3, 1966  2 Sheets-Sheet 1
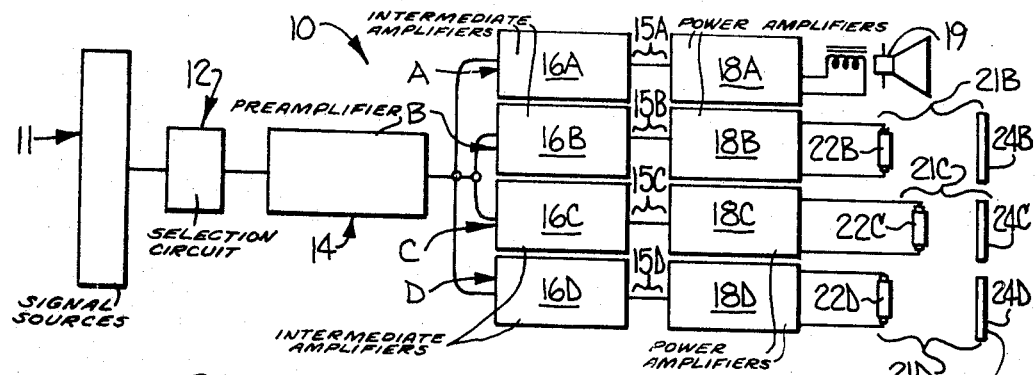
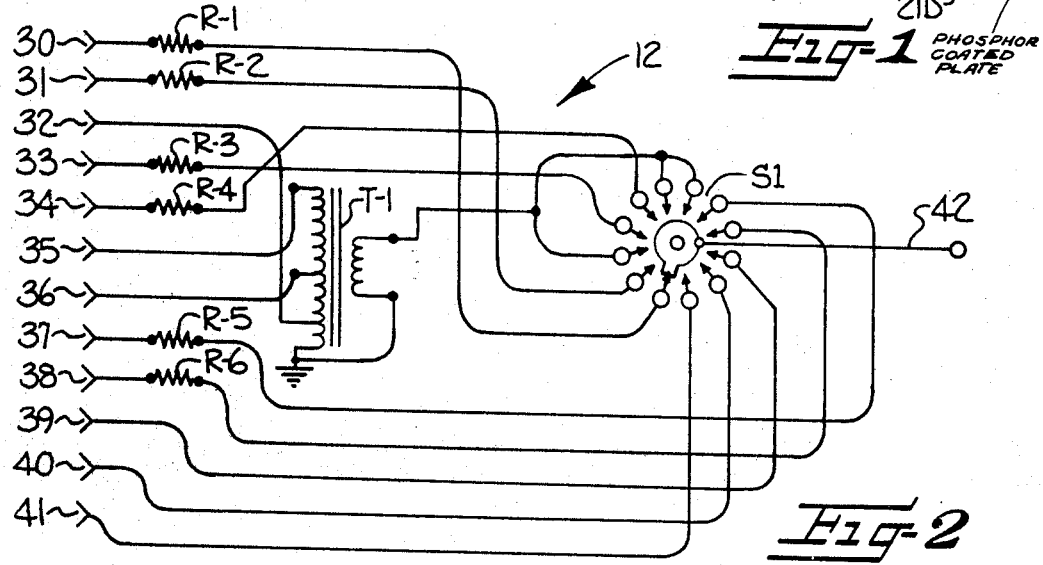
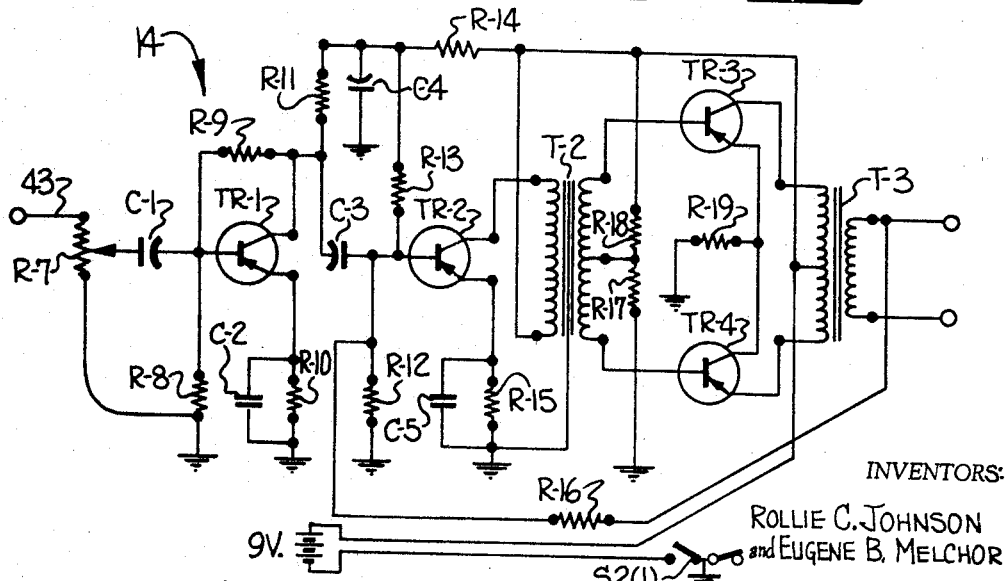
INVENTORS:
ROLLIE C. JOHNSON
and EUGENE B. MELCHOR
BY Parrott, Bell, Seltzer, Park & Heard
ATTORNEYS INVENTORS:
ROLLIE C. JOHNSON and
EUGENE B. MELCHOR BY Parrott, Bell, Seltzer, Park & Heard
ATTORNEYS United States Patent Office 3,474,774
Patented Oct. 28, 1969

3,474,774
METHOD AND APPARATUS FOR PRESENTATION OF AURAL EFFECTS AND VISUAL DISPLAYS
Rollie C. Johnson and Eugene B. Melchor, Mooresville, N.C., assignors to E & T Company, Mooresville, N.C., a partnership
Filed Nov. 3, 1966, Ser. No. 591,831
Int. Cl. A61b 19/00; A61n 5/06; A61h 5/00
U.S. Cl. 128—1           9 Claims

ABSTRACT OF THE DISCLOSURE

An apparatus and method for presenting simultaneous aural effects of sound and visual displays of varying colored lights wherein accurate response in the generation of light is obtained by the application of an audio frequency current to gaseous discharge lamps for exciting the lamps to emit light with an intensity dependent on the amplitude of audio frequency current applied thereto and independent of the frequency of such current.

---

Our invention relates to a method and apparatus for presentation of aural effects and visual displays and, more particularly, to an apparatus for presenting to mentally disturbed or mentally ill patients simultaneous and coordinated aural effects of sound and visual displays of colored light and a method of presenting such effects and displays.

The therapeutic use of color has long been known, particularly the favorable effect of color on patients suffering from mental disturbances or mental illness, and various techniques have been heretofore developed for practicing such use of color. While most generally known therapeutic use of color lies in the selection of colors applied to the environment of a patient, a technique which has been favorably reported is the presentation to a patient of aural effects or sounds, such as music, and visual displays of colored light coordinated to and accompanying the aural effects. In this technique, the hues of color presented in the displays vary in close coordination to the aural effects, preferably in a non-objective display not intended to represent physical objects. Presentation of simultaneous and coordinated aural effects and visual displays of colored light has a soothing and stabilizing effect on patients.

Such therapy has hertofore had only a limited use, principally as a result of the means which have heretofore been available to practice the technique. More particularly, that means has been specially prepared movie films, of an animated type, which carry sound tracks and abstract or non-objective color images coordinated to the aural effects derived from the sound tracks and which are projected, as are other sound movie films, to present coordinated aural and visual effects and displays. The preparation of such a film is understandably time consuming, the films are relatively expensive, and as a result only a limited number of such films are available for therapeutic use. With the limited number of films, the possibility exists that the therapeutic value of any given film decreases with increasing familiarity of a patient with the particular film in use. It would be desirable to have available for therapeutic use an apparatus which could be used in conjunction with any available or selected source of audio frequency electrical current from which an aural effect could be derived to simultaneously coordinate visual displays of colored light with the aural effects.

Accordingly, it is an object of this invention to provide an apparatus for presenting simultaneous and coordinated aural effects and visual displays of colored light, derived from an audio frequency electrical current. In realizing this object, the apparatus of this invention may be employed with any suitable source of such a current, to present an aural effect and non-objective visual display of colored light derived from that current. The visual display presented may, if so desired, maintain a constant coordination to a particular pattern of current, so that if the current may be reproduced, as by any known recording means, any desired display may be reproduced at will. However, as an infinite variation in the patterns of change of the current may be obtained through suitable choice of conventional sound records, an infinite variation in effects and displays may be obtained.

Apparatus has heretofore been proposed to produce, for entertainment purposes only, visual displays of colored light which are correlated to sounds. Such entertainment apparatus has suffered from a number of serious deficiencies which render the apparatus unattractive for therapeutic use. Principally, the difficulty with such apparatus has been that the colored lights of the visual display are not properly coordinated with the aural effects even though the visual displays are correlated to the aural effects. Due to the lack of proper coordination, such apparatus is not capable of accurate reproduction of colored light of varying hues together with the tints, shades and tones thereof or of proper response to the aural effects in presenting the visual displays. These and other deficiences of prior apparatus have resulted from the use in the apparatus of means to present the visual display which do not present a constant impedance to an audio frequency electrical current, and from the highly specialized circuitry which has heretofore been required in order to obtain what was considered to be an entertaining correlation between aural effects and visual displays. The varying impedance of the display means and the highly specialized electrical circuitry have both distorted the visual displays of colored light, and have made impossible the attainment of proper coordination between the effects and displays.

We have discovered a method by which the deficiencies of previously known apparatus may be entirely avoided, and simultaneous and properly coordinated aural effects and visual displays may be presented. In particular, we have discovered that excitation of gaseous discharge lamps with audio frequency electrical current to produce visual displays of colored lights makes possible proper coordination of simultaneous visual displays and aural effects so as to obtain reproducibility of a colored light display representing the frequency content of a current from which an aural effect is derived, due to the substantially constant impedance of a gaseous discharge lamp when such a current is applied thereto. Accordingly, it is an object of the invention to provide a method of presenting coordinated aural effects and visual displays of colored light wherein the visual displays are produced by excitation of gaseous discharge lamps with at least selected frequency portions of an audio frequency electrical current.

Some of the objects and advantages of this invention having been stated, others will appear as the description proceeds when taken in connection with the accompanying drawings, in which:

FIGURE 1 is a block diagram representation of the apparatus system of this invention;

FIGURE 2 is a schematic wiring diagram of an input selector switch for the apparatus of this invention;

FIGURE 3 is a schematic wiring diagram of a preamplifier for the apparatus of this invention;

Figure 4:
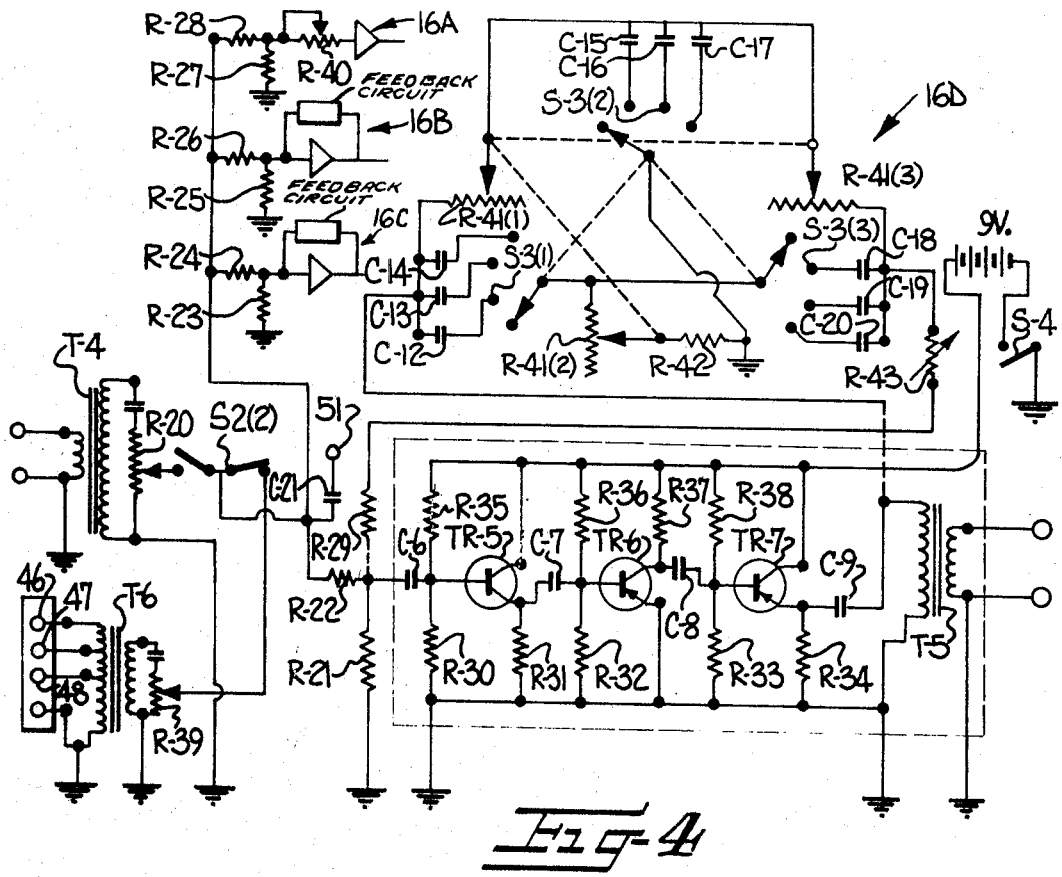
FIGURE 4 is a schematic wiring diagram of an intermediate amplifier for the apparatus of this invention.

Referring now more particularly to the drawings, a block diagram (FIGURE 1) of an apparatus, indicated generally at 10, embodying this invention and schematic wiring diagrams (FIGURES 2-5) of portions of the apparatus 10 have there been shown, and a general description of the method of our invention and the operation of the apparatus will be given with respect to those diagrams.

We have discovered that the impedance of a gaseous discharge lamp, such as a fluorescent lamp, is substantially independent of frequency when an audio frequency electrical current is applied to the lamp electrodes. This characteristic of a gaseous discharge lamp, which to our knowledge has not heretofore been recognized, is in marked distinction to the characteristics of all other electrically energized light sources known to us. More particularly, it is widely known that the impedance presented by an incandescent lamp or an electroluminescent lamp is dependent upon the frequency of an electrical current applied to the lamp. Further, and presumedly as a result of the dependence of impedance upon frequency, the quantity and color of light produced from such sources upon excitation by audio frequency current varies with frequency fluctuations, where the average power delivered to the lamp is maintained constant. The substantially constant impedance presented by a gaseous discharge lamp, under similar circumstances, maintains consistent energy transfer to the lamp and results in a light output which is not frequency dependent. This discovery is utilized, in the method and apparatus of our invention, to obtain visual displays of colored light which more accurately represent the simultaneously presented aural effects than has heretofore been possible. Further, the accuracy inherent in the method and apparatus of our invention, and gained through the use of gaseous discharge lamps, more readily permits the achievement of an effect which, to the eye of an observer, appears as a full rendition of all colors.

In practicing our method of presenting simultaneous and coordinated aural effects and visual displays of colored light, an apparatus 10 (FIGURE 1) is used in conjunction with a suitable selected signal source 11 in which an audio frequency electrical current is originated. The audio frequency electrical current originating with the selected signal source 11 is received by a preamplifier 14, which passes and amplifies substantially the full frequency content of the current. The amplified current from the preamplifier 14 is received by a plurality of channel amplifier systems 15, which preferably are four in number and are herein identified as channels A, B, C, and D. One of the channel amplifier systems, namely system 15A, passes and amplifies substantially the full frequency content of the current received from the preamplifier 14, and the amplified output current from that one channel amplifier system 15A is applied to an audio transducer, such as a loudspeaker 19, to produce an aural effect.

Simultaneously with the application of the full frequency content of the audio frequency electrical current to the loudspeaker 19, each of the remaining channel amplifier systems 15B, 15C and 15D selectively amplifies a particular portion of the frequency content of the current, as will be hereinafter described in greater detail.

While selectively amplifying portions of the frequency content of the current in the channel amplifier systems 15B, 15C, and 15D, we excite a plurality of gaseous discharge lamps 22 which are included in a plurality of visual display means 21. Each lamp 22B, 22C, and 22D, respectively, is excited by applying directly to the lamp a selected frequency band portion of the frequency content of the current, as received from a respective channel amplifier system 15B, 15C, and 15D. The conventional ballast and starters used in normal operation of a gaseous discharge lamp are not employed in practicing the method of our invention, as the lamps emit light solely by excitation with audio frequency electrical current and the heaters which are in some instances provided within the lamp are not used.

Preferably, the gaseous discharge lamps 22B, 22C and 22D, respectively, are selected to be of a type emitting light in a frequency region not visible to the normal human eye. In developing the colored lights of the visual display, we excite a plurality of phosphor coated plates 24B, 24C and 24D to emit visible light of selected hues by impinging upon the respective plates the light emitted by the corresponding gaseous discharge lamps. Preferably, the plates 24B, 24C, and 24D are of a transparent material such as Plexiglas, in order that the visible light resulting from excitation of the phosphor coatings may readily be seen, and the coatings emit light in primary hues. The plates may be arranged in side-by-side relation, to display bands of colored light, but preferably are used in conjunction with a suitable optical system (not shown) to obtain blending of the three primary hues of colored light and thus appear to the eye of an observed to present all hues of color. Varied arrangements are possible with the phosphor coated plates 24, and other phosphor coated surfaces may be employed if so desired for a particular display arrangement, so long as each phosphor coating receives and is excited solely by light emitted from a corresponding gaseous discharge lamp so as to prevent cross-excitation of the channels.

As is generally known, a wide variety of signal sources capable of originating an audio frequency electrical current are generally available, in the form of phonographic record players, tape recording play-back devices, radio tuners, and microphones. It is contemplated that the apparatus 10 of this invention may be used with any such known signal source 11, and a selection circuit 12 (FIGURE 2) provides a means of readily selecting one of a number of available sources and properly matching the output from the selected source to the amplifiers of the apparatus 10. While any suitable number of selectable inputs may be provided, with the input circuitry to match the impedances of the sources to the input impedance of the preamplifier 14, an operative embodiment of the apparatus 10 incorporates a selection circuit 12 (FIGURE 2) having a twelve position switch S–1 and the following inputs:

TABLE

| Source Type | Source Impedance, ohms |
|---|---|
| Input Number: | |
| 30 — High Impedance Microphone | 50,000 |
| 31 — Medium Inpedance Microphone | 25,000 |
| 32 — Low Impedance Microphone | 50 |
| 33 — Crystal Cartridge | 2,000–4,000 |
| 34 — Magnetic Cartridge | 50,000 |
| 35 — High Impedance Tape Head | 600 |
| 36 — Medium Impedance Tape Head | 300 |
| 37 — Auxiliary Medium High Impedance | 4,000–5,000 |
| 38 — Auxiliary Low Impedance | 1,500–3,000 |
| 39 — Direct Coupling for RIAA | Nominal 3,000 |
| 40 — Direct Coupling for LP | Nominal 3,000 |
| 41 — Direct Coupling for 78 | Nominal 3,000 |

In the specific selection circuit 12 (FIGURE 2) the following component values have been found satisfactory:

| Component: | Description |
|---|---|
| R–1 | 47 kilohms. |
| R–2 | 27 kilohms. |
| R–3 | 3.7 kilohms. |
| R–4 | 47 kilohms. |
| R–5 | 5 kilohms. |
| R–6 | 3 kilohms. |
| T–1 | 600–300–50 ohm primaries to 3,000 ohm secondary. |

Through means of the selection circuit 12, the impedance of a selected signal source 11 is substantially matched, in the operating embodiment of the apparatus 10, to the nominal input impedance of 3,000 ohms of the preamplifier 14 circuit (FIGURE 3). The audio frequency electrical current originating in the selected signal source 11 is passed from the selection circuit 12 through a conductor 42, and received by the preamplifier 14 through a conductor 43.

As is generally known, those devices enumerated as suitable for use as the signal source 11 originate audio frequency electrical currents which vary in frequency content. Certain devices, due to limitations imposed in their design, originate signals having a frequency content which is less than the full frequency range audible to the normal human ear. Others, due to different operational limitations, originate electrical currents having a frequency content substantially that of such range, or from 20 cycles per second to 20,000 cycles per second. It is for this reason that the impedance matching obtained through the selection circuit 12 is provided, and that the preamplifier 14 of the apparatus 10 must be adapted to pass and amplify the full frequency content of the normal range of human audibility without distorting the relative frequency content of the current. The preamplifier circuit shown in detail in FIGURE 3 has been found to be suitable for use in the apparatus 10 of this invention, but other suitable circuits may be used. That preamplifier circuit has a sensitivity of 0.88 millivolts and a nominal input impedance of 3,000 ohms. The output of the preamplifier circuit is approximately 100 milliwatts when terminated on an 8 ohm load, and the frequency response is essentially flat from 20 to 20,000 cycles per second. The following components are used.

| Component: | Characteristics |
| --- | --- |
| R–7 | 50 kilohms (linear taper gain control). |
| R–8 | 100 kilohms. |
| R–9 | 400 kilohms. |
| R–10 | 1 kilohm. |
| R–11 | 10 kilohms. |
| R–12 | 5 kilohms. |
| R–13 | 25 kilohms. |
| R–14 | 1 kilohm. |
| R–15 | Do. |
| R–16 | 100 kilohms. |
| R–17 | 100 ohms. |
| R–18 | 5 kilohms. |
| R–19 | 10 ohms. |
| C–1 | 10 microfarads. |
| C–2 | Do. |
| C–3 | Do. |
| C–4 | 30 microfarads. |
| C–5 | 10 microfarads. |
| TR–1, TR–2, TR–3, TR–4 | 2N280. |
| T–2 | Interstage transformer. |
| T–3 | 600 ohms primary to 8 ohms secondary. |

The secondary winding of the output transformer T–3 of the preamplifier 14 is connected by suitable plugs and conductors with the primary winding of a transformer T–4. The secondary winding of this transformer T–4 is connectable, through a switch S–2 to be described hereinafter and a matching circuit, to the inputs of four channel intermediate amplifiers 16A, 16B, 16C and 16D, each being a portion of a respective channel amplifier system 15A, 15B, 15C and 15D. Through the matching circuit now to be described, amplified audio frequency current having the full frequency content of the current originated in the source 11 is applied to the channel amplifier systems 15. Inasmuch as the basic circuitry used in each of the intermediate amplifiers 16 is essentially similar, only one such intermediate amplifier has been shown in a detailed schematic wiring diagram (FIGURE 4), and the portions of the intermediate amplifier circuitry which are identical as used in all channels will first be described in conjunction with the matching circuit. The distinctions between the particular circuitry used in the intermediate amplifiers for each of the channels A, B, C, and D will be subsequently pointed out.

In order to assure proper matching of the output impedance of the preamplifier to the input impedances of the four intermediate amplifiers 16A, 16B, 16C and 16D of the channel amplifier systems 15, this invention directs audio frequency current from the preamplifier to the primary winding of a matching circuit transformer T–4. The secondary of the transformer T–4 is shunted by a capacitor and a resistor R–20 having a variable tap connection. A plurality of parallel connected voltage divider networks formed by resistors R–21 through R–28 are selectively connectable to the variable tap connection through a switch S–2 and are coupled by respective D.C. blocking capacitors in the amplifier 16 circuitry to the amplifier inputs. Through the use of parallel connected voltage dividing networks, uniformity in the current applied to each of the intermediate amplifier 16 is assured, while the variable tap connection to the resistor R–20 provides sufficient adjustability to assure proper impedance matching. Briefly, the detailed basic circuit design of an intermediate channel amplifier 16 (within the dotted line enclosure in FIGURE 4) may be any suitable amplifier design which is capable of passing and amplifying substantially the full frequency content of an audio frequency electrical current of from 20 to 20,000 cycles per second without distorting the frequency content. Preferred circuit embodiments for the matching circuit and the basic amplifier have been shown in FIGURE 4, and in an operating apparatus constructed in accordance with this invention, the following components were used for the matching circuit described above and for the basic circuitry of the amplifier:

| Component: | Characteristics |
| --- | --- |
| T–4 | 8 ohm primary to 2,500 ohm secondary (Stancor A8102). |
| R–20 | 2.5 kilohms. |
| R–21 | 4 kilohms. |
| R–22 | Do. |
| R–23 | Do. |
| R–24 | Do. |
| R–25 | Do. |
| R–26 | Do. |
| R–27 | Do. |
| R–28 | Do. |
| R–30 | 2 megohms. |
| R–31 | 1.5 kilohms. |
| R–32 | 150 kilohms. |
| R–33 | 2 megohms. |
| R–34 | 1.5 kilohms. |
| R–35 | 100 kilohms. |
| R–36 | 150 kilohms. |
| R–37 | 1.6 kilohms. |
| R–38 | 100 kilohms. |
| C–6 | 10 microfarads. |
| C–7 | 4.7 microfarads. |
| C–8 | Do. |
| C–9 | 6 microfarads. |
| TR–5, TR–6, TR–7 | 2N358A. |
| T–5 | 1,700 ohms primary to 8 ohms secondary (Stancor A8080). |

In order to provide for the use of the apparatus 10 of this invention with existing preamplifiers, such as are provided in certain signal source devices, special provision is made for disconnection of the matching circuit for the intermediate amplifiers 16 from the preamplifier 14 and for alternative connection thereof to auxiliary inputs at various selected impedance levels. More particularly, a multiple pole double throw switch S–2 is incorporated in the circuitry of the preamplifier 14 and the matching circuit for the intermediate amplifiers 16. The switch S–2 is preferably a double pole double throw switch, with one pole of the switch controlling the connection of the matching circuit to the tapped resistor R–20 across the secondary of the transformer T-4 connected to the preamplifier and the other pole controlling the application of operating voltage to the preamplifier 14. Thus, with the switch S-2 in the operating position to have the intermediate amplifiers 16 receive current from the preamplifier 14 (left-hand switch contacts in FIGURES 3 and 4 closed), operating voltage is applied to the preamplifier 14 and the output current appearing at the tap location along the resistor R-20 across the secondary winding of the matching transformer T-4 is applied to the intermediate amplifiers 16 for amplification thereby. With the switch S-2 in the opposite operating position (right-hand switch contacts in FIGURES 3 and 4 closed), a tap location along a resistor R-39 connected across the secondary winding of an auxiliary input transformer T-6 is connected to the voltage dividing networks and thus to the inputs of the intermediate amplifiers 16. Primary windings of the auxiliary input transformer T-6 are connected to a plurality of auxiliary inputs 46, 47 and 48 which suitably are adapted to input impedances of 4, 8 and 16 ohms. The secondary winding impedance of transformer T-6 and the value of resistor R-39 preferably are both 1 kilohm. When it is determined that such auixilary inputs not requiring preamplification are to be employed, the selector circuit 12 and preamplifier 14 are not used in producing the aural effects and visual displays obtainable with the apparatus of this invention.

As pointed out more fully herebelow, the circuitry shown diagrammatically full in FIGURE 4 is appropriate for an intermediate channel amplifier 16 in one of the channels B, C or D which produces a visual display. Intermediate channel amplifiers for the other two of the visual display channels B, C, and D and for the aural effect channel A are represented by blocks in FIGURE 4. As to the aural effect channel, one distinction lies in the provision of a channel gain control in the form of a variable resistor R-40 interposed between the voltage divider network R-27 and R-28 and the amplifier 16A in order to permit an operator to readily adjust the volume of sound issuing from the loudspeaker 19. A further, and more important, distinction will be brought out hereinafter.

While the intermediate amplifier 16A incorporated in the channel amplifier system 15A, which passes substantially the full frequency content of the audio frequency electrical current, is substantially identical to the basic amplifier described generally above, the channel intermediate amplifiers 16B, 16C and 16D used in the remaining channel amplifier systems 15B, 15C and 15D for developing visual displays are constructed to selectively amplify a predeterminable frequency band portion of the full frequency content of the audio frequency electrical current. More particularly, each of the channel intermediate amplifiers 16 employed in the visual display channel amplifier systems 15B, 15C and 15D is provided with a frequency selective negative feed-back loop, effective to determine the frequency band portion of the input audio frequency current which appears as amplified current at the secondary of the intermediate amplifier output transformer T-5. Such a feed-back loop is shown connected to the basic intermediate channel amplifier 16 by dotted lines (FIGURE 4), inasmuch as such circuitry is employed only in the channel intermediate amplifiers for producing the visual display, and is indicated in block diagram form in association with other similarly indicated intermediate amplifiers.

Selective audio amplifiers such as are obtained by the use of a negative feed-back loop with the intermediate amplifier 16 as known to electronic designers. In such amplifiers, the feed-back loop is designed to reject that frequency or that range of frequencies which are to be selected and amplified. One illustrative type of feed-back circuit is that shown schematically in FIGURE 4 and known to designers as the parallel-T or twin-T circuit. However, it is recognized that other circuits operating in a similar manner may be designed and it is comprehended by this invention that such circuits may be used in obtaining audio frequency selective amplifiers.

Preferably, a multiple pole multiple position switch S-3 is incorporated in each such feed-back loop circuit for permitting variation of the general range of frequencies selected and amplified by each channel intermediate amplifier 16. Each of the multiple positions of the switch S-3 is correlated to a particular frequency band portion, and those portions preferably are 20 to 200 cycles per second, 200 to 2,000 cycles per second, and 2,000 to 20,000 cycles per second. In order to obtain these pass band characteristics, the components of the feed-back loop have the following values in an operating embodiment of the apparatus of this invention:

| Component: | Characteristics |
|---|---|
| R-41(1) | kilohms 100 |
| R-41(2) | do 25 |
| R-41(3) | do 100 |
| R-42 | do 1 |
| R-43 | do 50 |
| C-12 | microfarads .1 |
| C-13 | do .01 |
| C-14 | do .001 |
| C-15 | do .1 |
| C-16 | do .01 |
| C-17 | do .001 |
| C-18 | do .1 |
| C-19 | do .01 |
| C-20 | do .001 |

In the feed-back loop circuit, the three sections of variable resistor R-41 are ganged to track together, and permit adjustment of the center frequency of the band portion which is rejected by the circuit and thus selectively amplified by the intermediate amplifier 16. Variable resistor R-43 controls the slope or incremental frequency change attenuation of the feed-back loop circuit, and thus has the effect of permitting adjustment of the range of frequencies around the center frequency which are rejected by the circuit and thereby selectively amplified.

In order to permit calibration of the light output of each channel amplifier system 15B, 15C and 15D, to thus assure that proper coordination is obtained between the visual displays and the aural effects, and that a proper blending of the hues of colored light as viewed by an observer can be obtained to effectively reproduce all known colors, we provide means to inject a frequency from a calibrated oscillator signal source into the matching circuit for the intermediate amplifiers 16A, 16B, 16C and 16D. More particularly, and as indicated by dotted lines (FIGURE 4), a connector 51 is provided and connected to the matching circuit voltage divider networks through a suitable D.C. blocking capacitor C-21. By applying a calibrated frequency signal through the calibration inputs 51, the light output from the respective channels B, C, and D may be accurately balanced for the particular frequency and power content of the injected signal. By successive injection of signals with the power content of the injected calibration signals being held constant and the frequency modified to the center frequency of the band portion being passed by a corresponding channel amplifier system, the light output in lumens from each channel may be adjusted to a proper coordination so that the blend of the colored light produced by the three channels, in equal portions, will produce light which appears to the eye of an observer as white light.

The frequency content of the current selectively amplified by a channel intermediate amplifier 16 is applied to a channel power amplifier 18, which similarly must be capable of amplifying and passing the full frequency content of the current derived from the signal source 11. While various power amplifier circuits may be practical, a circuit used in an operative embodiment of the apparatus 10 of this invention has been shown in FIGURE 5, and the following components have been found satisfactory:

| Component: | Characteristics |
|---|---|
| R-44 | 5 kilohms. |
| R-45 | 2.7 kilohms. |
| R-46 | 47 kilohms. |
| R-47 | 150 ohms. |
| R-48 | 22 kilohms. |
| R-49 | 270 ohms. |
| R-50 | 1 kilohm. |
| R-51 | 2.7 kilohms. |
| R-52 | 100 ohms. |
| R-53 | 270 ohms. |
| TM-1 | Thermistor. |
| C-22 | 10 microfarads. |
| C-23 | 100 microfarads. |
| C-24 | 470 microfarads. |
| C-25 | 100 microfarads. |
| C-26 | 1000 microfarads. |
| TR-8, TR-9 | 2N180. |
| TR-10 | 2N182. |
| TR-11, TR-12 | 2N256. |
| T-7 | 8 ohm primary to 3,000 ohm secondary. |
| T-8 | 8 ohm primary to lamp imperance secondary. |

It is to be noted that the output from the power amplifiers 18 is a true audio frequency electrical current, rather than a fluctuating D.C. current, as may be developed by rectification of an audio frequency current, or a clipped audio frequency electrical current in which the amplitude of the current is limited to a predetermined peak. It is the cooperation of the audio frequency electrical current, as developed at the secondary of the transformer T-8 in accordance with this invention, with the particular visual display means 21 (described in greater detail hereinafter), which permits the accuracy of reproduction and other favorable effects obtained by the apparatus 10 of our invention.

Figure 5:
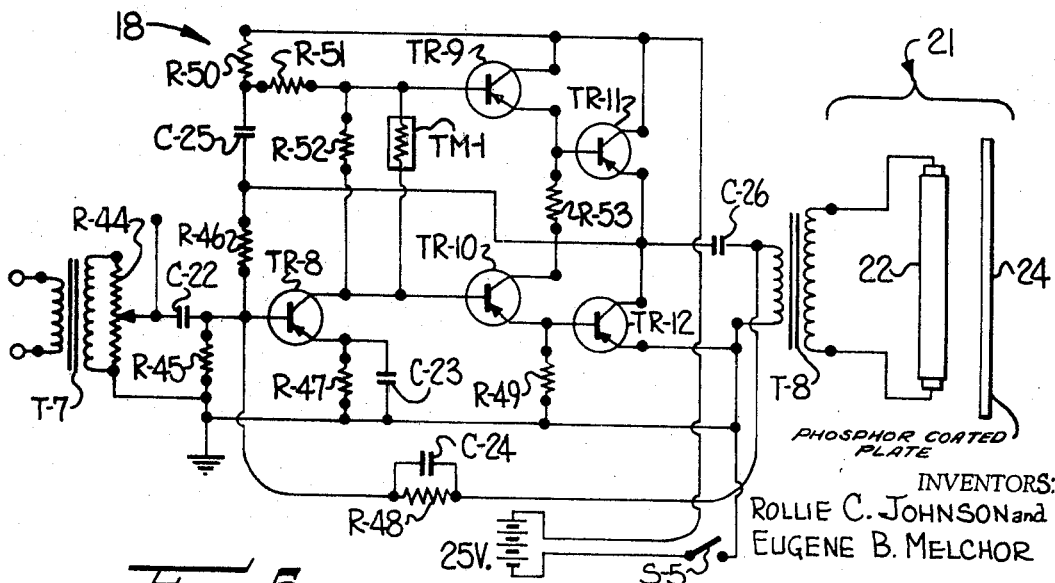
FIGURE 5 is a schematic diagram of a power amplifier for the apparatus of this invention, including a colored light output stage.

In order to display visible light simultaneously with and in true coordination to the aural effects developed by the channel A and presented through the loudspeaker 19, we provide visual display means 21B, 21C and 21D, respectively, to receive amplified audio frequency electrical current from the respective channel amplifier systems 15B, 15C and 15D. One such visual display means is shown in FIGURE 5, and includes a gaseous discharge lamp 22. As here employed, the gaseous discharge lamp 22 is used without the ballast and starter which have heretofore been necessary in order to obtain the emission of light from such a gaseous discharge lamp. Instead, the audio frequency electrical current from the power amplifier 18 is applied directly to the gaseous discharge lamp 22, exciting the same to emit light in exact coordination to the fluctuation of that current. As stated above, we have discovered that the input impedance of a gaseous discharge lamp, when audio frequency electrical current is thus applied to the lamp, remains substantially constant. As a result, the transformer T-8 of the channel power amplifier 18, may be selected to properly match the input impedance of the gaseous discharge lamp 22 to the output impedance of the power amplifier 18. While the particular input impedance of a gaseous discharge lamp 22 may be expected to vary with the choice of particular lamp style selected, the average impedance of lamps which have been used in an operating embodiment of the apparatus 10 of this invention is approximately 2,500 ohms, which impedance is substantially constant across a frequency range substantially the same as the range of audibility of the normal human ear, or from to 20 to 20,000 cycles per second.

Preferably, in accordance with our invention, the gaseous discharge lamp 22 is selected to emit light of a frequency not normally visible to the human eye but capable of exciting phosphors to emit visible light. More particularly, we prefer to use a lamp emitting light in the ultraviolet portion of the frequency spectrum of light, such as the Sylvania F4T5/BL which emits light at a predominant wave-length of approximately 352 millimicrons.

In order to develop visual displays of colored light from the ultraviolet light emitted from the gaseous discharge lamp 22, and to obtain other advantages to be described in greater detail hereinafter, we provide a phosphor-coated plate 24 operatively related to each respective gaseous discharge lamp 22 to receive the light emitted from the lamp. The phosphor coating is excited by the lamp light impinging thereon, to emit visible light of a selected hue. As is generally known, phosphor coatings may be selected to emit light of any particular chosen hue, as a wide variety of such phosphor coatings are generally commercially available. Additionally, the various commercially available phosphors will have varying luminescent effects, as continuing to emit visible light for a short time period after the exciting radiation has been removed. These possibilities of phosphor coatings are employed, in the apparatus of our invention, to permit a still wider range of usefulness.

For example, the varying luminescent effects of various phosphor coatings may be employed to obtain variable delays in the decay of the visible light emitted by the visual display means 21. That is, where the audio frequency electrical current ultimately applied to the gaseous discharge lamps contains many rapid fluctuations, phosphor coatings having substantial luminescent effects may be found desirable in order to avoid the appearance of flickering in the displays of colored light. Similarly, where a very quick response to fluctuations in the audio frequency electrical current is desired, phosphors having little or no luminescent effect should be selected. While it is normally preferred that the phosphor coatings employed for the plates 24B, 24C, and 24D of the three channels emit visible light of three distinct primary hues, the apparatus 10 of this invention may readily be adapted for use with persons having vision limitations by substitution of plates carrying phosphor coatings which produce visible light of more closely related hues. By such a substitution, for example, a visual display of varying shades of green light may be developed rather than a visual display which would include all possible colors.

In the drawings and specification, there has been set forth a preferred embodiment of the invention, and although specific terms are employed, they are used in a generic and descriptive sense only and not for purposes of limitation, the scope of the invention being defined in the claims.

We claim:

1. A method of presenting simultaneous and coordinated aural effects and visual displays of varying colored lights comprising the steps of originating an audio frequency electrical current of widely varying frequency; amplifying the full range of frequencies of the current and producing sound by applying the amplified full range current to an audio transducer while simultaneously selectively amplifying a number of limited frequency band portions of the current and producing light by exciting an equal number of gaseous discharge lamps to emit light of an intensity dependent on the amplitude of the respective selectively amplified, limited band current and independent of the frequency thereof by applying the selectively amplified, limited band currents thereto; and developing from the light a visual display of visible, varying colored light simultaneous with the sound and incorporating a number of hues equal to the number of said limited frequency band portions of said audio frequency current.

2. A method as claimed in 1 wherein said lamps upon excitation primarily emit light not visible to the normal human eye and wherein the step of developing a visual display includes exciting a plurality of phosphors to emit visible light in different hues by impinging upon each phosphor light emitted by a corresponding lamp.

3. A method as claimed in claim 2 wherein said lamps primarily emit light of a wavelength in the ultraviolet region.

4. A method as claimed in claim 2 wherein three frequency band portions are provided.

5. A method as claimed in claim 4 wherein said phosphors primarily emit light of three primary hues.

6. Apparatus for the presentation of simultaneous and coordinated aural effects and visual displays of varying colored lights and comprising means for originating an audio frequency electrical current of widely varying frequency means for producing an aural effect including an amplifier operatively connected to said current originating means for amplifying substantially the full range of frequencies of said audio frequency current and an audio transducer for receiving amplified current from said amplifier and transducing the amplified current into sound, and means for developing a visual display of visible, varying colored lights including a number of frequency band selective amplifiers operatively connected to said current originating means independently of said aural effect means for selectively amplifying an equal number of limited frequency band portions of said audio frequency current and at least an equal number of gaseous discharge lamps each receiving amplified, limited band, audio frequency current from one of said selective amplifiers for excitation to emit light of an intensity dependent on the amplitude of the respective one of said limited frequency band portions of said audio frequency current and independent of the frequency thereof, said visual display means producing light simultaneously with the production of the aural effect produced by said aural effect means and incorporating a number of hues equal to the number of said limited frequency band portions.

7. Apparatus as claimed in claim 6 wherein each of said amplifiers comprises an intermediate amplifier operatively connected to said current originating means and a power amplifier operatively connected to the respective intermediate amplifier, and each of said intermediate amplifiers of said frequency selective amplifiers includes a frequency band portion determining feedback circuit.

8. Apparatus as claimed in claim 7 wherein each of said frequency band portion determining circuits includes switch means for selecting one of a plurality of predetermined frequency band portions.

9. Apparatus as claimed in claim 6 wherein said gaseous discharge lamps emit light substantially invisible to the human eye and said display means further includes a plurality of luminescent elements responsive to said lamp light to emit light substantially visible to the human eye, each of said luminescent elements receiving lamp light from a respective one of said gaseous discharge lamps and emitting visible light coordinated thereto.

References Cited
UNITED STATES PATENTS

| | | | |
|---|---|---|---|
| 2,532,731 | 12/1950 | Potter | 250—71 X |
| 3,163,077 | 12/1964 | Shank | 84—464 |
| 3,205,755 | 9/1965 | Sklar | 84—464 |

WILLIAM E. KAMM, Primary Examiner

U.S. Cl. X.R.

250—80